United States Patent
Onomatsu

(10) Patent No.: US 6,924,848 B2
(45) Date of Patent: Aug. 2, 2005

(54) DIGITAL/ANALOG TELEVISION SIGNAL RECEIVING SET

(75) Inventor: Takehiro Onomatsu, Osaka (JP)

(73) Assignee: Funai Electric Co., Ltd. (JP)

( * ) Notice: Subject to any disclaimer, the term of this patent is extended or adjusted under 35 U.S.C. 154(b) by 449 days.

(21) Appl. No.: 10/005,874

(22) Filed: Dec. 4, 2001

(65) Prior Publication Data

US 2002/0089603 A1 Jul. 11, 2002

(30) Foreign Application Priority Data

Dec. 5, 2000 (JP) ...................................... P 2000-369804

(51) Int. Cl.⁷ ................................................ H04N 5/50
(52) U.S. Cl. ......................... 348/732; 348/554; 725/38; 725/59
(58) Field of Search ............................... 348/732, 735, 348/554, 725; 725/38, 59, 56

(56) References Cited

U.S. PATENT DOCUMENTS

| | | | |
|---|---|---|---|
| 6,115,080 A | * | 9/2000 | Reitmeier ................... 348/731 |
| 6,483,547 B1 | * | 11/2002 | Eyer ........................... 348/473 |
| 6,490,001 B1 | * | 12/2002 | Shintani et al. ............. 348/554 |
| 6,600,522 B1 | * | 7/2003 | Kim ............................ 348/732 |
| 6,721,018 B1 | * | 4/2004 | Shintani et al. ............. 348/731 |

FOREIGN PATENT DOCUMENTS

JP        2000-59180        2/2000

* cited by examiner

Primary Examiner—Victor R. Kostak
(74) Attorney, Agent, or Firm—Osha Liang LLP

(57) ABSTRACT

The digital/analog television signal receiving set 10 includes a tuner 12, and the tuner 12 receives television signals of ATSC system and NTSC system. In the case of automatic scanning, a virtual channel table with respect to television signals of ATSC system capable of being received is stored in the memory 28. A channel number of television signals of NTSC system capable of being received is stored in the memory 28. Successively, it is detected whether or not an analog television channel described on the virtual channel table stored in the memory 28 can be received. When it is possible to receive the analog television channel, the channel number of the television signal of NTSC system is deleted from the memory 28. However, when it is possible to receive the analog television channel, the analog television channel included on the virtual channel table is deleted from the memory 28.

6 Claims, 3 Drawing Sheets

VIRTUAL CHANNEL TABLE

| MAJOR NUMBER | MINOR NUMBER | CARRIER FREQUENCY (MHz) | SIGNAL TYPE |
|---|---|---|---|
| 12 | 0 | 205.25 | ANALOG |
| 12 | 1 | 620.31 | DIGITAL |
| 12 | 5 | 620.31 | DIGITAL |
| 12 | 12 | 620.31 | DIGITAL |
| 12 | 31 | 620.31 | DIGITAL |

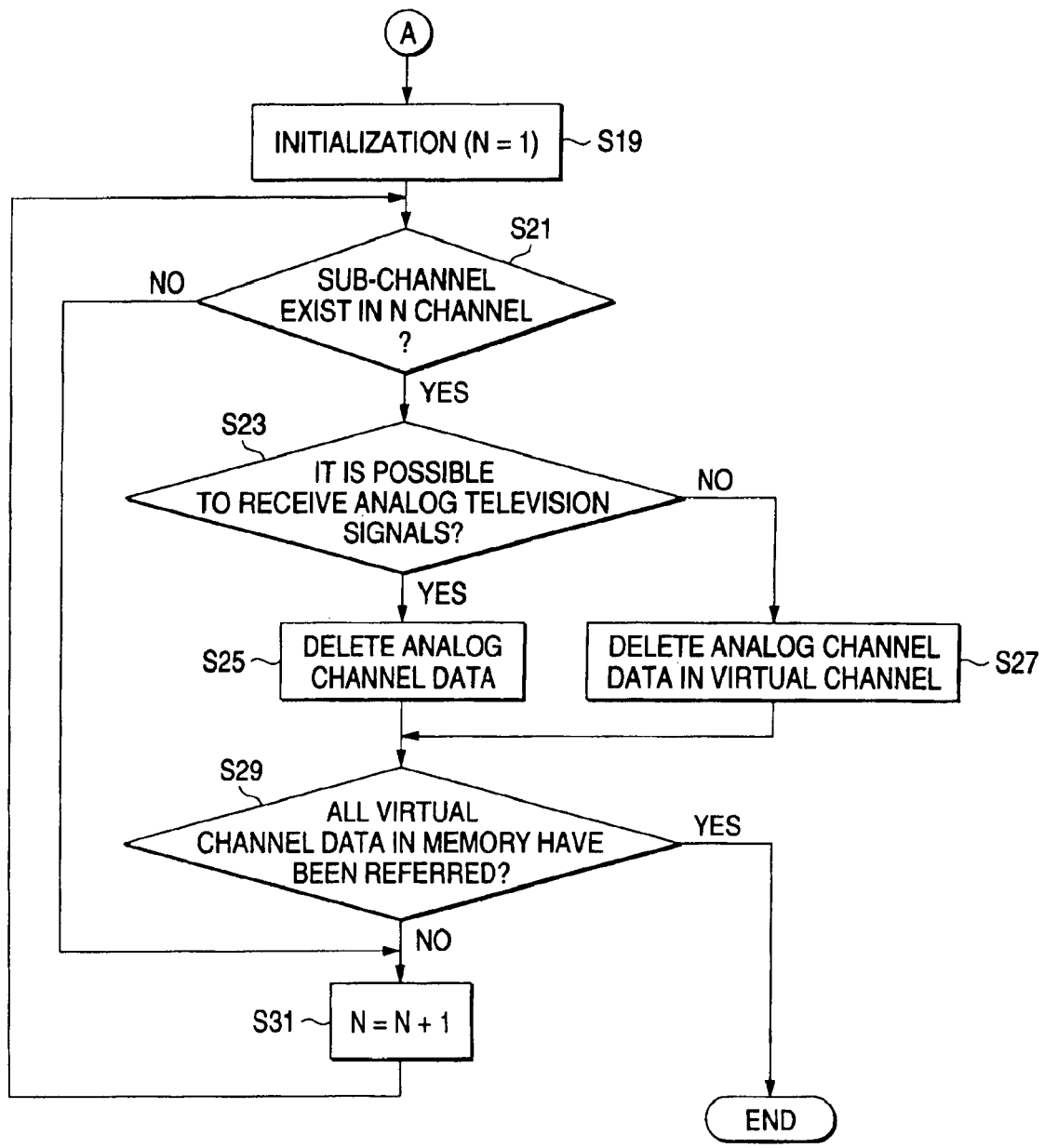

DIGITAL/ANALOG TELEVISION SIGNAL RECEIVING SET

BACKGROUND OF THE INVENTION

1. Field of the Invention

The present invention relates to an analog/digital television signal receiving set. More particularly, the present invention relates to a digital/analog television signal receiving set capable of receiving signals of ATSC system and NTSC system.

2. Related Art

An example of this conventional type digital/analog television signal receiving set is disclosed in the official gazette of Japanese Unexamined Patent Publication No. 2000-59180 [H03J 5/24, H04B 1/16, H04N 5/44], the application of which was open to the public on Feb. 25, 2000. In this television set, the conventional analog television channel is discriminated, and skip flag data of each channel, which has been discriminated before, are stored in the memory. Next, the digital television channel is discriminated, and skip flag data of each digital television channel, which has been discriminated before, are stored in the memory without deleting or overwriting the channel map information of the analog television channel. As described above, when the channel map of the television channel, the format of which is analog and digital, is made, it is possible for a user to easily conduct tuning of only an effective channel (channel capable of being watched).

[Problems to be Solved]

However, according to the above prior art, mapping is conducted on all the channels capable of being watched. Therefore, the following problems may be encountered. The conventional analog television channel and the analog television channel, which is contained in the virtual channel of the digital television channel, are stored being overlapped on each other. That is, a plurality of analog television channels of NTSC system are stored. Further, even in the case where television broadcasting of the analog television channel is not conducted or in the case where although television broadcasting of the analog television channel is conducted, it is impossible to normally receive analog television signals due to the receiving environment, the analog television channel is described in the virtual channel. Therefore, tuning of the television channel is troublesome.

SUMMARY OF THE INVENTION

It is a primary object of the present invention to provide a digital/analog television signal receiving set capable of simply conducting tuning of a desired television channel.

[Means for Solving the Problems]

The first invention provides a digital/analog television signal receiving set capable of receiving signals of ATSC system and NTSC system comprising: a first storage member for storing a virtual channel of television signals of ATSC system capable of being received; a second storage member for storing a first analog television channel of television signals of NTSC system capable of being received; a detecting member for detecting a state of receiving a second analog television channel included in the virtual channel when automatic scanning is conducted; a first deletion member for deleting the first analog television channel when the state of receiving shows that it can be received; and a second deletion member for deleting the second analog television channel when the state of receiving shows that it can not be received.

The, second invention provides a digital/analog television signal receiving set capable of receiving signals of ATSC system and NTSC system comprising: a first storage member for storing a virtual channel of television signals of ATSC system capable of being received; a second storage member for storing a first analog television channel of television signals of NTSC system capable of being received; a detecting member for detecting a state of receiving a second analog television channel included in the virtual channel table; and a deletion member for deleting one of the first and the second analog television channel according to the state of receiving.

In this digital/analog television signal receiving set, for example, it is possible for one tuner to receive television signals of the digital and the analog format such as ATSC system and NTSC system. When a user inputs a command of automatic scanning, television signals of ATSC system are searched in the order of a channel, the number of which is small, and a table of a virtual channel of the television signals capable of being received is stored in the first storage member such as a memory. In the same manner, when a user inputs a command of automatic scanning, television signals of NTSC system are searched in the order of a channel, the number of which is small, and a channel number of the first analog television channel with respect to the television signals capable of being received is stored in the second storing member (memory). In this way, the channel numbers and others with respect to the digital and the analog television signals capable of being received can be stored in the memory. The detecting member detects a state of receiving of the second analog television channel included in the virtual channel in the case of automatic scanning. In the case where the state of receiving of the second analog television channel shows that it is possible to receive, the first deletion member deletes the first analog television channel from the memory. On the other hand, in the case where the state of receiving of the second analog television channel shows that it is impossible to receive, the second deletion member deletes the second analog television channel from the table (memory) of the virtual channel. That is, it is possible to delete the overlapping analog television channel, and also it is possible to delete the analog television channel incapable of being received.

According to the present invention, the overlapping channel can be deleted and also the channel incapable of receiving the broadcasting (program) can be deleted. Therefore, it is possible to simplify the channel map. Accordingly, a user can simply tune a desired channel, that is, the maneuverability can be enhanced.

These and other objects, characteristics and advantages of the present invention will become more apparent in the detailed description and embodiments which follow, referring to the drawings.

BRIEF DESCRIPTION OF THE DRAWINGS

FIG. 4 is a flow chart showing another portion of processing conducted by CPU in the embodiment shown in FIG. 1.

DETAILED DESCRIPTION OF THE PREFERRED EMBODIMENTS

Figures 1, 2:
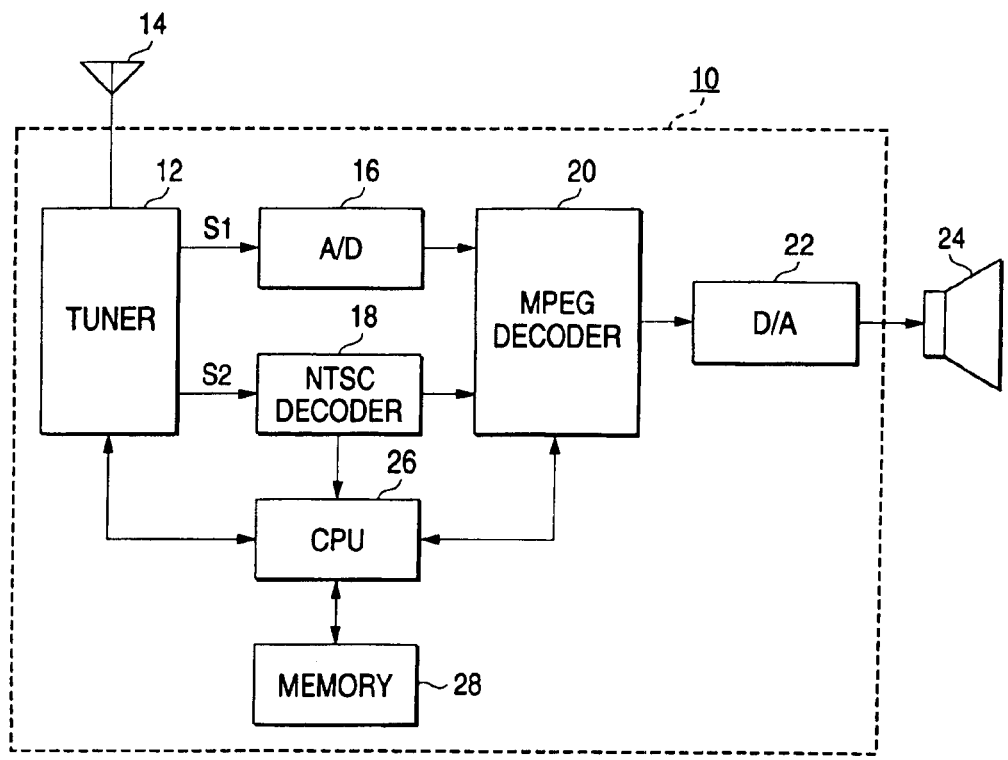
FIG. 1 is a schematic illustration showing an embodiment of the present invention.
FIG. 2 is a schematic illustration showing an example of a table of a virtual channel.

Referring to FIG. 1, the digital/analog television signal receiving set 10, which will be referred to as a receiving set hereinafter, of this embodiment includes a tuner 12. This tuner 12 is connected with an antenna 14. The antenna 14 receives ground wave broadcasting signals (television signals) which are modulated digitally or analogously, and these television signals are inputted into the tuner 12. For example, in this embodiment, television signals (digital television signals) of ATSC system, which is the United States Standard, are received by the antenna 14, and television signals (analog television signals) of NTSC system are also received by the antenna 14. In other words, one tuner 12 is capable of receiving both television signals of ATSC system and NTSC system.

The tuner 12 outputs an intermediate frequency signal S1 or S2 of the digital or the analog television signal to be received according to the channel data which are set by CPU 26.

For example, in this embodiment, the frequency synthesizer type tuner 12 is adopted. According to the frequency data which are set by CPU 26, the tuner 12 changes a dividing ratio of a variable divider (not shown), so that a desired channel can be received.

CPU 26 receives a channel number inputted by a user with an input device (not shown) provided in the receiving set 10 or a remote controller (not shown), and sets the channel data corresponding to the channel number in the tuner 12. According to the channel number inputted by the user, CPU 26 discriminates a type of a television signal to be received. Specifically, according to the sub-channel (minor number) included in the virtual channel described later, CPU 26 discriminates the television signal between a digital television signal and an analog television signal.

Although not shown in the drawing, the memory 28 stores a frequency table corresponding to each channel of the digital television broadcasting and also stores a frequency table corresponding to each channel of the analog television broadcasting. That is, the memory 28 stores a frequency table corresponding to each channel stipulated by the standard of ATSC system and a frequency table corresponding to each channel stipulated by the standard of NTSC system.

Accordingly, CPU 26 discriminates a type of the television signal according to the channel number inputted by the user and acquires a frequency corresponding to the channel number from the table concerned and sets frequency data (channel data) corresponding to the frequency in the tuner 12.

In the case of receiving a digital television signal, frequency data stipulated by the standard of ATSC corresponding to the channel inputted by the user are set in the tuner 12, and an intermediate frequency signal S1 is outputted. This intermediate frequency signal S1 is given to A/D converter 16 and converted into digital data. The intermediate frequency signal S1, which has been converted into digital data, is MPEG-demodulated by MPEG recorder 20. That is, video data (primary video data and auxiliary video data) and sound data are demodulated. These video and sound data are converted into analog signals by D/A converter 22, and the video signal converted into the analog signal is outputted from the display 24 such as CRT or LCD.

The sound signal converted into the analog signal is outputted from a speaker via a sound processing section not shown such as an amplifier.

On the other hand, in the case where the analog television signal is received, frequency data stipulated by the standard of NTSC system corresponding to the channel inputted by the user are set in the tuner 12. In the case where the analog television signal is received, when the frequency is shifted, it is impossible to correctly receive a television signal and an image and voice to be outputted are disturbed. Therefore, the frequency is adjusted by an automatic frequency adjusting (AFT) circuit not shown, and the intermediate frequency signal S2 of the analog television signal is outputted from the tuner 12. The intermediate frequency signal S2 is given to NTSC decoder 18 and demodulated to a broadcasting signal of NTSC system. That is, the intermediate frequency signal S2 is demodulated to a video signal and sound signal of NTSC system. This video signal is outputted from the display 24 via MPEG decoder 20 and D/A converter 22.

However, in MPEG decoder 22, auxiliary video signals such as a channel number, characters and marks of character broadcasting, which are displayed on the display 24, are superimposed (added). That is, in MPEG decoder 22 and D/A converter 24, demodulation and analog conversion are not conducted on the video and the sound signal which have been demodulated from the analog television signal.

In this connection, the sound signal is given to the sound processing section via MPEG decoder 20 and D/A converter 22 and outputted from the speaker.

For example, when the user inputs a command of automatic scanning with a control panel or remote controller, whether or not a digital television signal exists is judged in the order of a channel, the number of which is small. That is, according to the above table, CPU 26 sets frequency data in the tuner 12. In the case where the channel concerned exists, a table of a virtual channel (virtual channel table) with respect to that channel, which is shown in FIG. 2, is stored in the memory 28.

The above processing is carried out for all channels (69 channels in this embodiment), and a virtual channel table of the channels, in which the digital television signals exist, is stored in the memory 28.

This virtual channel table will be explained as follows. Channel "12-0" is an analog television channel, and channel "12-1" is a channel for displaying an auxiliary image such as characters and marks on an image plane in the case where the analog broadcasting (program), to which channel "12-0" is allotted, is watched. Channel "12-5" is a digital television channel for watching the same digital broadcasting as channel "12-0". Channels "12-12" and "12-31" are channels for displaying an auxiliary image and others on an image plane in the case where the digital broadcasting allotted to channel "12-5" is watched.

Accordingly, when the user operates a control panel or remote controller so as to select (tune) channel "12-0" or "12-5", it is possible to receive a program of the corresponding analog or digital television signal.

In the automatic scanning processing, a channel of the analog television signal of NTSC system is also preset. That is, in the same manner as that of presetting the digital television signal, the frequency data are set in the order of a channel, the number of which is small, referring to the above table. Further, a fine adjustment is conducted on the frequency by AFT. When a program (broadcasting) exists, the channel number of this channel is stored (preset) in the memory 28.

However, CPU 26 receives V-sync data, H-sync data and chroma data from NTSC decoder 20 and discriminates whether or not an actual broadcasting exists in the analog television signals which are being received.

As described above, automatic scanning processing is carried out, and channel numbers of the digital and the analog television signal capable of being received can be acquired.

However, in the case where the analog television channel included in the virtual channel table can be received, that is, in the case where the program can be watched, the analog television channel, which has been preset with respect to the analog television channel of NTSC system, and the analog television channel, which is included on the virtual channel table, are overlapped with each other and stored in the memory 28. When the channel map is displayed in this case, channels, which can be selected with respect to the same content, are displayed being overlapped. In the case where it is impossible to receive the analog television channel included on the virtual channel table, if the virtual channel table is left as it is, it is included in the channels capable of being selected although the actual program (broadcasting) does not exist or although it is impossible to receive the program because the receiving environment is not prepared regardless existence of the broadcasting.

Accordingly, channel selection (tuning) is troublesome and operation becomes complicated. Therefore, in this embodiment, in the former case, the analog television channel (channel number) is deleted from the memory 28 in the case of presetting the analog television signal of NTSC system, so that the overlap of the analog television channel of NTSC system can be avoided. In the latter case, the analog television channel included on the virtual channel table is deleted from the memory 28, so that the user can be prevented from selecting (tuning) the analog television channel, the broadcasting of which does not exist, or which is incapable of being received. That is, the unnecessary analog television channel is deleted so as to simplify the channel map.

Figure 3:
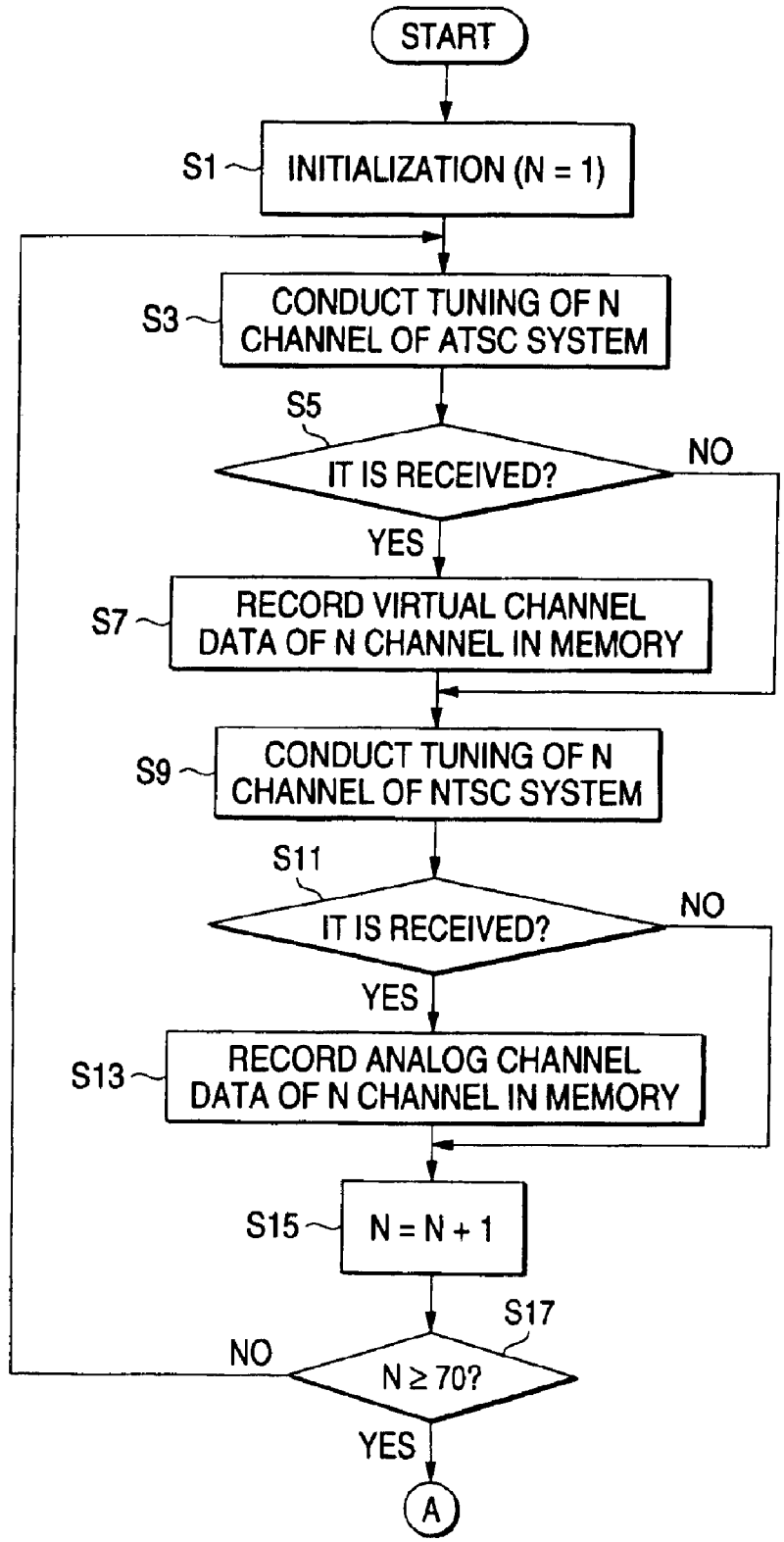
FIG. 3 is a flow chart showing a portion of processing conducted by CPU in the embodiment shown in FIG. 1.

Specifically, CPU 26 processes the flow chart shown in FIGS. 3 and 4 and makes the channel map. When the user inputs a command of automatic scanning, CPU 26 starts processing and initializes the channel number in step S1. That is, the count value N of a counter not shown is initialized (N=1). Successively, in step S3, the channel (N channel), the number of which is directed by the count value N, is subjected to tuning. Specifically, CPU 26 acquires a frequency corresponding to the channel N from the above digital television channel table and sets the channel data corresponding to the frequency in the tuner 12. Accordingly, the intermediate frequency signal S1 can be extracted.

Successively, in step S5, whether or not the digital television signal of channel N is received is judged. Specifically, whether or not the signal can be correctly demodulated by MPEG decoder 20 is judged. When it is "NO" in step S5, that is, when the digital television signal of channel N is not received, the program proceeds to step S9 as it is. On the other hand, when it is "YES" in step S5, that is, when the digital television signal of channel N is received, the virtual channel data acquired with respect to the channel are stored in the memory 28 in step S7, and the program proceeds to step S9.

In step S9, tuning is conducted on channel N of NTSC system. Specifically, CPU 26 acquires the frequency of channel N from the analog television channel table and sets the frequency data corresponding to the frequency in the tuner 12. In tuner 12, the frequency is finely adjusted by AFT. Successively, in step S11, whether or not channel N of NTSC system is received is judged. That is, CPU 26 judges whether or not the actual program (broadcasting) exists according to V-sync data, H-sync data and chroma data outputted from NTSC decoder 18. When it is "NO" in step S11, that is, when it is impossible to receive channel N, the program proceeds to step S15 as it is. On the other hand, when it is "YES" in step S11, that is, when it is possible to correctly receive channel N, the analog television channel data (channel number) with respect to channel N of NTSC system are stored (preset) in the memory 28 in step S13. Then, the program proceeds to step S15.

In step S15, the count value N is subjected to increment (N=N+1). Successively, in step S17, whether or not the count value N is not less than 70 is judged. Specifically, it is judged whether or not scanning has completed with respect to all the channels of ATSC system and NTSC system. In the case of "NO" in step S17, that is, in the case where the count value N is lower than 70, it is judged that scanning has not been completed with respect to all the channels. Therefore, the program returns to step S3, and tuning is conducted for the next channel. In the case of "YES" in step S17, that is, in the case where the count value N is not less than 70, it is judged that scanning has been completed with respect to all the channels, and the program proceeds to step S19 shown in FIG. 4.

As shown in FIG. 4, in step S19, the count value N of the counter is initialized (N=1). Next, in step S21, a virtual channel table of the channel indicated by the counter value N is referred, and it is judged whether or not the sub-channel exists. Specifically, it is judged whether or not analog channel television data of the minor number "0" exists. In the case of "NO" in step S21, that is, in the case where no analog television channel exists in the virtual channel, the program proceeds to step S31 as it is.

On the other hand, in the case of "YES" in step S21, that is, in the case where an analog television channel exists in the virtual channel, in step S23, it is judged whether or not an analog television signal of the analog television channel existing in the virtual channel can be received. Specifically, it is judged whether or not it is an analog television channel stored in the memory 28 in step S13.

In the case of "YES" in step S23, that is, when it is an analog television channel stored in the memory 28, it is judged that the television channel can be received, and the television channel of NTSC system is deleted from the memory 28, and the program proceeds to step S29. On the other hand, in the case of "NO" in step S23, that is, in the case where the analog television channel is not stored in the memory 28, it is judged that the television channel can not be received. Then, in step S27, analog television channel data of the virtual channel are deleted, and the program proceeds to step S29.

In step S29, it is judged whether or not all the virtual channels stored in the memory 28 have been referred. Specifically, CPU 26 judges whether or not the count value N is not less than the number of the tables of the virtual channel stored in the memory 28. In the case of "NO" in step S29, that is, in the case where the count value N is lower than the number of the tables of the virtual channel stored in the memory 28, it is judged that all the virtual channels have not been referred, and the count value N is subjected to increment (N=N+1) in step S31, and the program returns to step S21. That is, the next virtual channel is referred.

On the other hand, in the case of "YES" in step S29, that is, in the case where the count value N is not less than the number of the tables of the virtual channel stored in the memory 28, it is judged that all the virtual channels have been referred, and processing is completed.

As described above, the analog television channel in the memory 28 is deleted, so that the channel map can be simplified. After that, when the channel map made by processing shown in FIGS. 3 and 4 is displayed on an image plane, the user can conduct tuning.

According to this embodiment, in the case where the analog television channel included in the virtual channel with respect to the digital television signal of ATSC system can be received, the analog television channel of NTSC system corresponding to the analog television channel is deleted. Accordingly, there is no possibility that the analog television channel is stored being overlapped.

In the case where the analog television channel included in the virtual channel can not be received, the analog television channel included in the virtual channel is deleted. Therefore, the channel in which no actual program (broadcasting) exists or the channel incapable of being received can be deleted from the memory.

Since the channel map can be simplified as described above, the user can easily select a desired channel. That is, the maneuverability can be enhanced.

In this connection, in this embodiment, a tuner of the frequency synthesizer system is adopted, however, it is possible to adopt a tuner of the voltage synthesizer system. In this case, CPU sets voltage data according to a voltage table corresponding to the digital/analog channel.

In this embodiment, explanations are made into a case in which ground waves are received, however, of course, the present invention can be applied to a case in which the cable television broadcasting is received. In this case, instead of an antenna, a cable is connected with the tuner.

Further, in this embodiment, explanations are made into a case in which the ground wave broadcasting of the United States is received. As long as a receiving set for receiving the same broadcasting system is used, it is possible to apply the present invention to a case in which the ground wave broadcasting of other countries is received. However, since the number of channels changes for each country or area, processing conducted according to judgment of the count value N in step S17 shown in FIG. 3 is changed.

What is claimed is:

1. A digital/analog television signal receiving set capable of receiving analog television signals and digital television signals comprising:

a storage member configured to store at least one of an analog television channel and a virtual channel table of television signals;

a detecting member configured to detect a state of reception of a digital television channel included in the virtual channel table,
   wherein the digital television channel corresponds to the analog television channel;

a deletion member configured to delete one of the analog television channel and the digital television channel from the storage member,
   wherein the deletion member is configured to delete the analog television channel from the storage member if the state of reception indicates that the digital television channel included in the virtual channel table is received; and
   wherein the deletion member is configured to delete the digital television channel from the storage member if the state of reception indicates that the digital television channel included in the virtual channel table is not received.

2. The digital/analog television signal receiving set of claim 1, wherein the detection member detects the state of reception when automatic scanning is conducted.

3. The digital/analog television signal receiving set of claim 1, wherein the virtual channel table includes the analog television channel.

4. A method for generating a channel map, comprising the steps of:

storing at least one of an analog television channel and a virtual channel table of television signals in a channel map;

detecting a state of reception of a digital television channel included in the virtual channel table,
   wherein the digital television channel corresponds to the analog television channel;

deleting the analog television channel if the state of reception shows that the digital television channel included in the virtual channel table is received; and deleting the digital television channel if the state of reception shows that the digital television channel included in the virtual channel table is not received.

5. The method of claim 4, wherein the detecting is executed when automatic scanning is conducted.

6. The method of claim 4, wherein the virtual channel table includes the analog television channel.

\* \* \* \* \*